E. MOSS.
ELECTRIC COOK STOVE.
APPLICATION FILED AUG. 14, 1911.
1,009,549.
Patented Nov. 21, 1911.
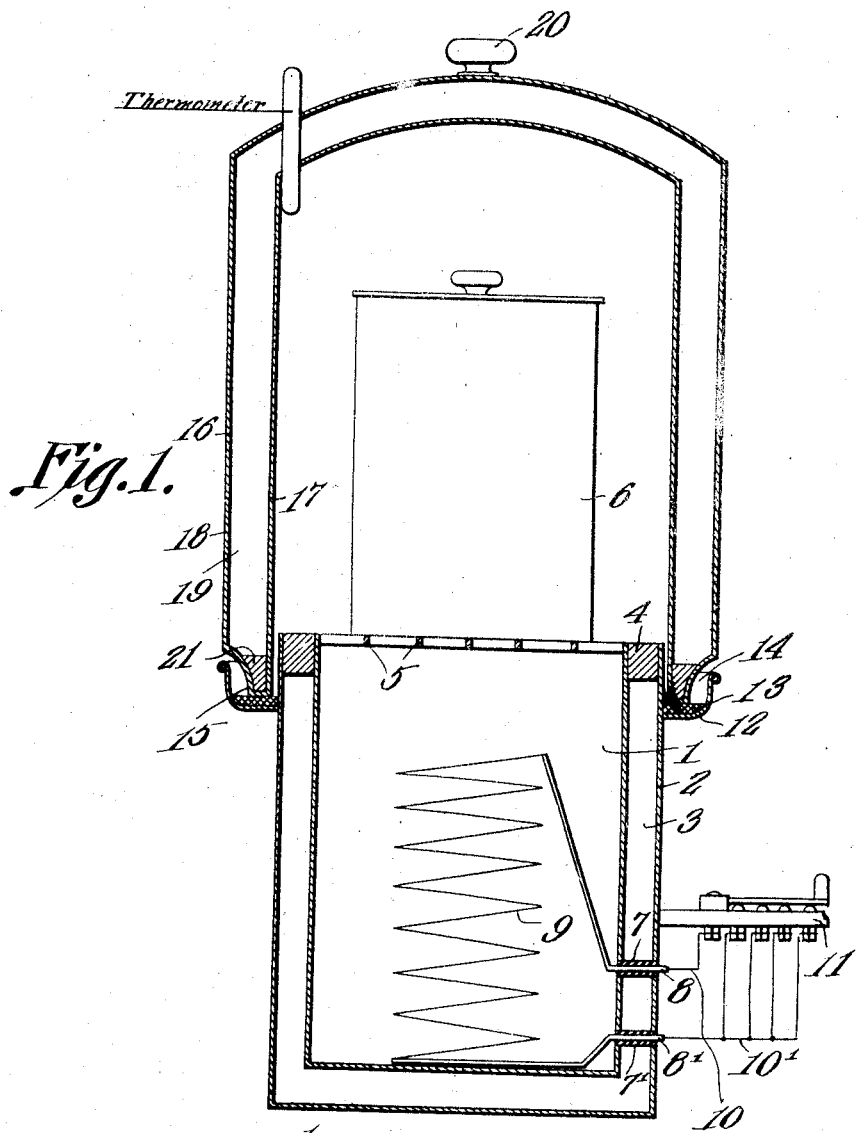
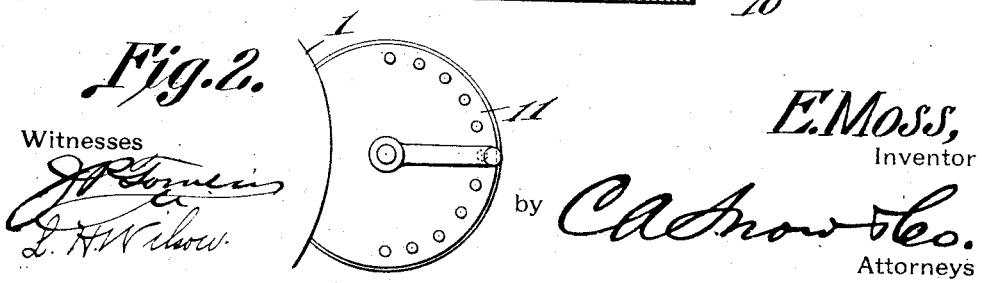
Witnesses
E. Moss,
Inventor
by C.A. Snow & Co.
Attorneys

UNITED STATES PATENT OFFICE.

ERIC MOSS, OF KINGSBURG, CALIFORNIA.

ELECTRIC COOK-STOVE.

1,009,549. Specification of Letters Patent. Patented Nov. 21, 1911.

Application filed August 14, 1911. Serial No. 643,951.

*To all whom it may concern:*

Be it known that I, ERIC MOSS, a citizen of the United States, residing at Kingsburg, in the county of Fresno and State of California, have invented a new and useful Electric Cook-Stove, of which the following is a specification.

This invention relates to improvements in electric cook stoves, the primary object of the invention being the provision of a coil compartment or receptacle provided with a vacuum wall and carrying a central supporting grate above the coil portion, in combination with a cover or dome also provided with a vacuum spaced portion surrounding the same so that when the dome is in operable relation with respect to the heating portion of the stove, that a complete vacuum will surround the cooking utensil and thereby prevent the outside atmosphere from effecting the interior of the apparatus, and whereby the heat within the apparatus may be retained at a uniform temperature to accomplish the desired cooking.

A further object of this invention is the provision of an electric cook stove made in two parts, a lower part having an electric heating coil therein while the upper part is a removable cover adapted to co-act therewith and have a peculiar form of joint, which will assist the walls of the respective compartments which are vacuum walls in retaining the heat within the stove and at the same time preventing the temperature on the outside from effecting the same.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a vertical central sectional view of the completed apparatus, a cooking utensil being in operable position therewith. Fig. 2 is a top plan view of a rheostat used to regulate the degree of heat within the apparatus.

Referring to the drawings, the numeral 1 designates the inner shell of the heating compartment encompassed by means of the outer shell, so as to provide a vacuum chamber 3 surrounding the walls and lower end of the compartment 1 while the annular ring 4 seals the upper end of the compartment and provides a means for connecting the respective shells or casings 1 and 2 relatively to each other, the circular grate 5 being disposed across the open mouth of the casing or compartment 1 to form a support for the cooking utensil 6.

Disposed in the walls of the compartments 1 and 2 and spanning the vacuum space 3 are the two tubes or sleeves 7 and 7', of insulation for the reception of the terminals 8 and 8' of the heating coil 9, which is disposed within the casing 1, concentrically thereof, so that the heat radiated therefrom will effect the cooking utensil 6 supported upon the grating 5. Connected to the terminals 8 and 8' are the conductor wires 10 and 10' which are connected to the rheostat 11, whereby the coil 9 may be heated to the desired temperature for cooking various victuals.

Disposed annularly of the casing 2 and slightly below the upper end thereof, is a rim or ring 12 having mounted in the lower portion thereof a gasket 13 of heat insulating material, the annular space 14, thereabove, being adapted to be filled or nearly so with water, so as to submerge the reduced annular end 15 of the dome or cover 16, which as clearly shown is formed of the two casings 17 and 18, the walls of which provide the annular vacuum space or chamber 19, the outer casing 18 carrying concentrically at the upper end thereof, the handle 20, and disposed within the reduced portion is a ring 21, which retains the said casings 17 and 18 relatively to each other, in the same manner as the ring 4.

Although the apparatus herein set forth has been described as being circular in cross section, it is apparent that it may be made in various shapes to conform to the various cooking utensils that it is desired to use in connection therewith, that is, it may be rectangular, oval or elliptical.

By insulating the interior of the apparatus from outside air by means of a vacuum space, it is evident that the rheostat 11 may be operated so that the coil 19 will be held at the desired temperature for the various cooking purposes and that the outside air will not in any way affect the space within the two compartments. By this construction it is evident that the desired temperature may be maintained to a certainty or nearly so for cooking.

By connecting the dome with the heating portion of the apparatus by means of the annular ring 12 providing the air preventing or leaking joint thereat, the leakage of the heat through such point is prevented and a practical vacuum insulated electrical cooking stove is provided.

By use of the thermometer as illustrated in Fig. 1, in conjunction with the rheostat or electric controller 11, it is evident that a desired temperature for cooking various victuals may be attained, thus providing a highly efficient and practical cooking apparatus, and one especially desirable for cooking meats and the like requiring a greater degree of heat than 212° F.

What is claimed is:

1. In an electric cooking stove, two coacting members, the walls of said members being each provided with a double wall separated by a vacuum space, an annular ring carried by one of said members and providing a receptacle to receive the rim of the open end of the other member, an electrical heating coil disposed in the member having the annular rim, and means for supporting a cooking utensil above said coil.

2. An electrical cooking stove, having a coil containing member having an inner casing insulated from the outside air by means of a vacuum chamber, a coil disposed within the inner chamber, an annular ring disposed at the upper end of said member, an open ended double walled dome adapted to have its open end surround the open end of the first mentioned member and fit within the annular ring thereof, said dome having a vacuum space surrounding the same, and means carried by the ring for engaging the rim of the dome and hermetically sealing the same.

3. In an electric cooking stove, a coil carrying member having an open upper end and provided with double walls forming a surrounding vacuum chamber, a grate disposed across the open end thereof, an annular ring carried exteriorly of said member near the upper end thereof, a double walled dome having a vacuum chamber within the walls thereof, said dome being adapted to have its open end surround the open end of the first mentioned member and fit within the annular ring thereof, and means mounted in the ring for sealing the joint at such point.

4. In an electric cooking stove, a casing, an electric coil disposed therein, a utensil supporting grate at the upper end of said casing, another casing surrounding the first mentioned casing and spaced therefrom to provide a vacuum chamber therearound, an annular ring connected at the upper end of said casing to hold the casings relatively to each other, an annular flange connected exteriorly of the outer casing near the upper edge thereof and providing an annular receptacle, and two casings forming a dome with a vacuum chamber thereabout adapted to fit over the open end of the first mentioned casing and within the receptacle formed by the flange ring.

In testimony that I claim the foregoing as my own, I have hereto affixed my signature in the presence of two witnesses.

ERIC MOSS.

Witnesses:
L. A. SPROWL,
C. H. ROSENDAHL.